US005909793A

United States Patent [19]

Beach et al.

[11] Patent Number: 5,909,793

[45] Date of Patent: Jun. 8, 1999

[54] COIN COUNTER PRIZE-AWARDING METHOD AND APPARATUS USING PROMOTIONAL COINS

[75] Inventors: Kirk W. Beach; Bruce Coonan, both of Issaquah, Wash.

[73] Assignee: Coinstar, Inc., Bellevue, Wash.

[21] Appl. No.: 09/128,440

[22] Filed: Aug. 4, 1998

[51] Int. Cl.[6] ................................ G07F 7/02; G06F 7/00

[52] U.S. Cl. ........................... 194/210; 194/213; 194/217

[58] Field of Search .................................... 194/210, 212, 194/213, 205, 216, 217, 214; 40/27.5

[56] References Cited

U.S. PATENT DOCUMENTS

| | | | |
|---|---|---|---|
| 3,766,452 | 10/1973 | Burpee et al. | 194/214 |
| 4,674,618 | 6/1987 | Eglise et al. | 194/205 |
| 5,166,502 | 11/1992 | Rendleman et al. | 40/27.5 |
| 5,290,033 | 3/1994 | Bittner et al. | 194/210 |
| 5,564,546 | 10/1996 | Molbak et al. | 194/216 |

*Primary Examiner*—F. J. Bartuska
*Assistant Examiner*—Bryan J. Jaketic
*Attorney, Agent, or Firm*—Sheridan Ross P.C.

[57] ABSTRACT

The present invention uses promotional coins to encourage use of a coin counter. The promotional coins are minted in such a way that an unaided human is not likely to distinguish a first prize coin from other promotional coins, e.g., because all promotional coins have substantially identical size, weight and appearance. Due to the apparent similarity between the various promotional coins, the participant is required to use a coin counter to distinguish prize coins from other promotional coins. In one embodiment, the promotion is implemented using a coin counter. Promotional coins are distributed to potential customers who are thereby enticed into using the coin counter as desired. The coin counter accepts and discriminates among government-minted coins of multiple denominations, various promotional coins and unknown debris. The denominations of the government-minted coins and the various promotional coins are distinguished using at least one non-visible characteristic, such as mass, conductivity, and/or magnetic permeability. At least any winning promotional coins are recognized by the coin-counter and the participant is notified. When the coin counter finishes counting all the coins, the participant is issued compensation for the government-minted coins.

54 Claims, 8 Drawing Sheets

COIN COUNTER PRIZE-AWARDING METHOD AND APPARATUS USING PROMOTIONAL COINS

The present invention relates to a promotional method and apparatus and in particular to a promotion which uses promotional coins to encourage use of a coin counter.

BACKGROUND INFORMATION

Typically, promotions attempt to encourage the participant to try a product or service in the hope that the participant will continue to use the item being promoted after the promotion ends. There are many different ways to promote a product which have varying rates of success. Examples include the various ways of advertising the item; coupons redeemable at the store; rebates mailed after purchase; and contests and sweepstakes, including those in which game pieces must match a given pattern, typically a writing or graphic.

Some promotions attempt to persuade the consumer to try or use the item being promoted. The promoters generally believe that if the consumer is enticed to try or use the product they may later continue to try or use the item without being enticed by the promotion (assuming the consumer is satisfied by the item). This scenario is illustrated by coupons or advertised discounts which give temporary discounts that make the product more affordable. Unfortunately, in certain previous approaches the consumer receiving the enticement does not assure the promoted item will ever be used. If the consumer never uses the product, the benefits of the product will never be experienced which makes future uses less likely. Therefore, a need arises to structure a promotion so that the consumer must use the item being promoted in order to receive the enticement.

It is seen as advantageous to encourage use of the item being promoted without defeating the purpose of the promotion. In some cases, promotions use game pieces which are recognizable by the participants as being winners or losers before the target product is used. If the participant knows which prize is to be awarded for the game piece and the prize is seen as insubstantial, the participant may forgo the promotion and decide to not use the target product. Therefore, a need arises to keep the value of the prize (or the "winning" nature of a game piece) secret until the participant uses the product.

Promotions often try to encourage the consumer to take a new course of action different from the old way in which the consumer performed a particular task. Encouraging consumers to try new things is seen as especially difficult when the item being promoted is new and unfamiliar to consumers. For example, some banks in an effort to persuade customers to use automated teller machines and online banking, charge a fee for use of a traditional human teller. In an effort to encourage automated teller machines and online banking, the banks penalize the customers who use traditional human tellers to promote the automated methods. By imposing the penalty for using the traditional human teller, the bank may not achieve the intended result of encouraging the customer to use the automated teller machines and online banking. The customer may simply use the human teller less often or switch to another bank. In other words, the bank while attempting to encourage use of automated methods of banking (i.e., an intended result), may instead, induce an unintended result of getting the customer to use the human teller less or switch to another bank. Therefore, there is a need to structure a promotion to encourage the consumer to use the product being promoted rather than taking a less desirable or unintended course of action.

The cost of the promotion is one of the concerns sponsors of a promotion often have. If a promotion costs more than the benefits it can produce, it is generally considered uneconomical. Costs associated with at least some kinds of promotions include the infrastructure required to, e.g., (1) recognize and validate a winning game piece and (2) deliver the prize to the participant. To validate the winning game piece and distribute the prize often requires the design and manufacture of custom hardware and hiring extra employees. It would be desirable to use existing hardware without more than minor modifications and without the need for additional support personnel to validate the winning game piece and/or distribute the prize.

SUMMARY OF THE INVENTION

The present invention uses promotional coins to encourage use of a coin counter. The promotional coins, while having an appearance different from non-promotional coins, such as government-minted coins, are minted in such a way that an unaided human is not likely to distinguish a first prize coin from other promotional coins, e.g., because all promotional coins have substantially identical size, weight and appearance. Due to the apparent similarity between the various promotional coins, the participant is required to use a coin counter to distinguish the winning coins from other promotional coins.

In one embodiment, the promotion is implemented using a coin counter. Promotional coins are distributed to potential customers who are thereby enticed into using the coin counter as desired. The coin counter accepts and discriminates among government-minted coins of multiple denominations, various promotional coins and unknown debris. The denominations of the government-minted coins and the various promotional coins are distinguished e.g. using at least one non-visible characteristic, such as mass, conductivity, and/or magnetic permeability. At least any winning promotional coins are recognized by the coin counter (and preferably kept separate from government-minted coins, such as by directing to a reject or customer return area) and the participant is notified in response to and/or directly by the coin counter (such as by outputting a notice on a voucher or other printed paper, preferably including a toll-free telephone number to be used in claiming the prize). When the coin counter finishes counting all the coins, the participant is issued compensation for the government minted coins.

DETAILED DESCRIPTION OF THE PREFERRED EMBODIMENTS

Figure 1:
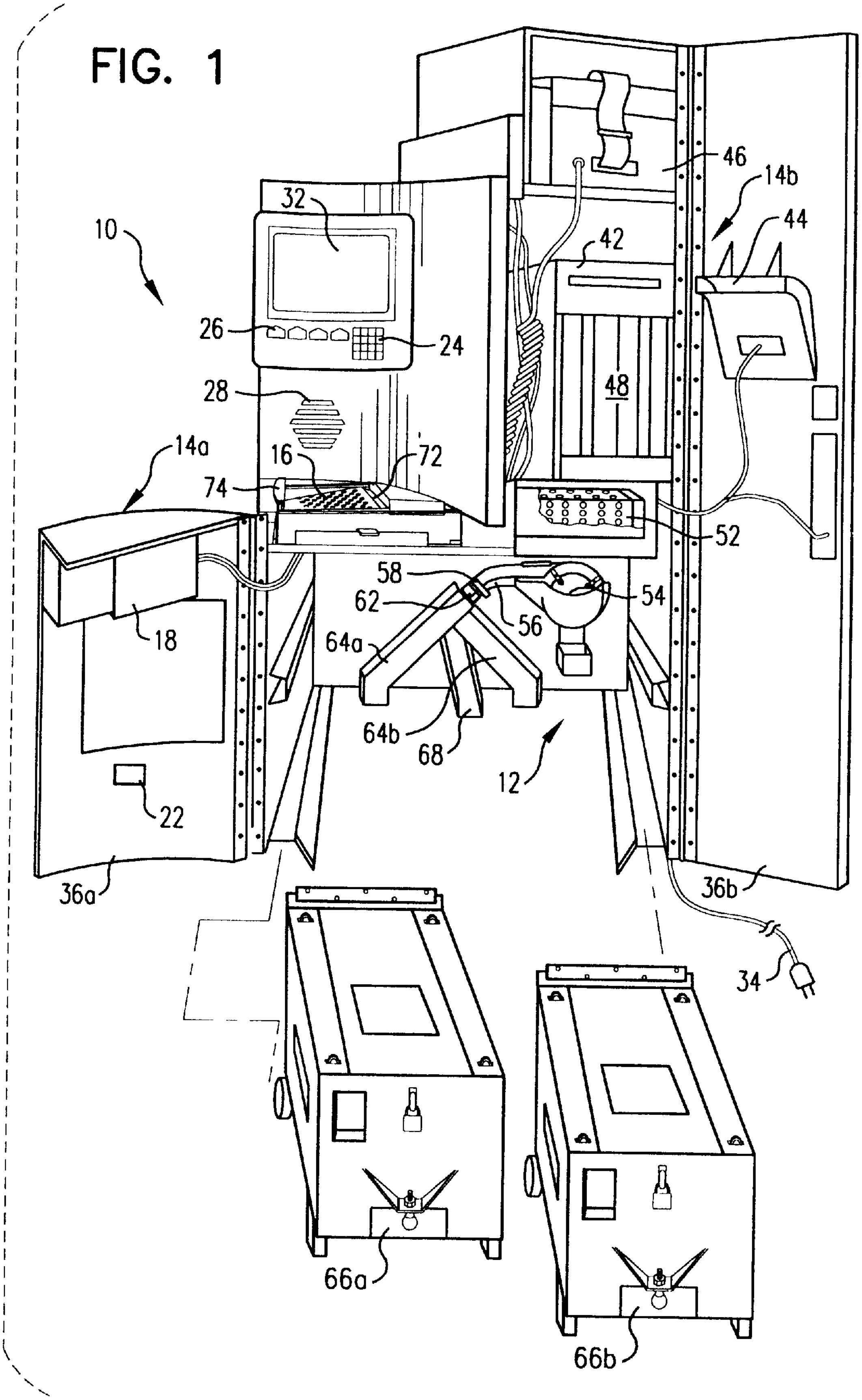
FIG. 1 depicts a coin handling apparatus that may be used in connection with an embodiment of the present invention.

The coin counter prize-awarding apparatus described herein can be used in connection with a number of devices and purposes. One device is illustrated in FIG. 1. The embodiment depicted in FIG. 1 generally includes a coin counting/sorting portion 12 and a coupon/voucher dispensing portions 14*a,b*. In the depicted embodiment 10, the coin counting portion 12 includes an input tray 16, a voucher dispensing region 18, a coin return region 22, and customer input/output (I/O) devices, including a keyboard 24, additional keys 26, a speaker 28 and a video screen 32. The apparatus 10 can include various indicia, signs, displays, advertisement and the like on its external surfaces. A power cord 34 provides power to the mechanism.

The general coin path for the embodiment depicted in FIG. 1 is from the input tray 16, down first and second chutes (not shown) to a trommel 52, to a coin pickup assembly 54, along a coin rail 56 and past a sensor 58. While passing the sensor 58, data is collected by which different denominations of government-minted and different types of promotional coins are discriminated. If, based on sensor data, it is determined that the coin can and should be accepted, a controllable deflector door 62 is activated to divert coins from their gravitational path to coin tubes 64*a,b* for delivery to one of the coin trolleys 66*a,b*. If it has not been determined that a coin can and should be accepted, includiing, in one embodiment, a determination, e.g. as described below, that a coin is a promotional coin, or a predetermined type of promotional coin,, the door 62 is not activated and coins (or other objects) continue down their gravitational or default path to a chute 68 for delivery to the customer-accessible return box 22.

To operate the coin counter, a user is provided with instructions such as on the computer screen 32. The user places a mass of coins, typically of a plurality of denominations of government-minted and types of promotional coins (typically accompanied by dirt or other non-coin objects) in the input tray 16. The user is prompted to push a button to inform the machine that the user wishes to have coins discriminated. Thereupon, the computer causes an input gate (not shown) to open and illuminates a signal to prompt the user to begin feeding coins. When the gate is open, a motor (not shown) is activated to begin rotating the trommel assembly 52. The user moves coins over the peaked output edge 72 of the input tray 16, typically by lifting or pivoting the tray by a handle 74, and/or manually feeding coins over the peak 72, whereupon the coins pass the gate (typically set to prevent passage of more than a predetermined number of stacked coins). Instructions on the screen 32 may be used to tell the user to continue or discontinue feeding coins, relay the status of the machine, the amount counted thus far, provide encouragement or advertising messages and the like.

First and second chutes (not shown) are positioned between the output edge 72 of the input tray 16 and the input to the trommel 52. Preferably, the second chute provides a funneling effect by having a greater width at its upstream edge than its downstream edge. Preferably, the coins cascade or "waterfall" when passing from the first chute to the second chute, e.g., to increase momentum and tumbling of the coins. The trommel 52, in the depicted embodiment is a perforated-wall, square cross-section, rotatably mounted container. The trommel is rotated about its longitudinal axis in order to remove debris from the coins.

Preferably, when the doors 36*a,* 36*b* are in the open position as shown, most or all of the components are accessible for cleaning and/or maintenance. In the depicted embodiment, a voucher printer (not shown) is mounted on the inside of the door 36*a*. The right-hand portion of the cabinet includes the coupon feeder 42 for dispensing, e.g., pre-printed manufacturer coupon sheets through a chute 44 to a coupon hopper on the outside portion of the door 36*b*. A computer 46, in the depicted embodiment, is positioned at the top of the right hand portion of the cabinet in order to provide a relatively clean, location for the computer. An I/O board 48 is positioned adjacent the sheet feeder 42.

Figure 2A:
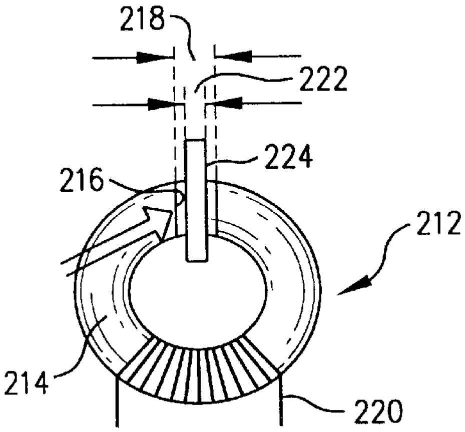
FIG. 2A is a front elevational view of a sensor and an adjacent coin, according to an embodiment of the present invention.
Figure 2B:
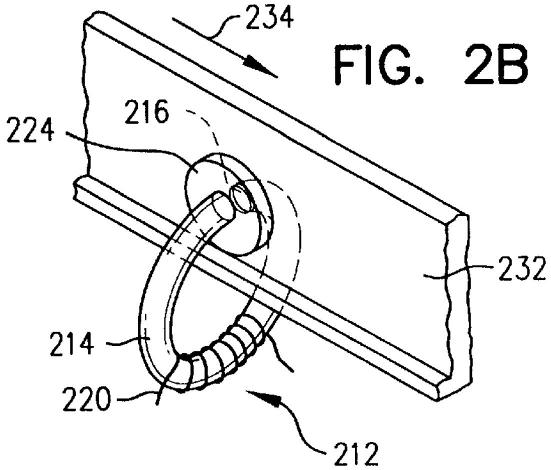
FIG. 2B is a perspective view of a sensor, an adjacent coin and a coin-transport rail according to an embodiment of the present invention.

In one embodiment a gapped toroid is used for a sensor which is depicted in FIGS. 2A and 2B. As depicted in FIG. 2A, a sensor 212 includes a core 214 having a generally curved shape and defining a gap 216, having a first width 218. In the depicted embodiment, the curved core is a toroidal section. The gapped toroid sensor is more fully described in U.S. patent application Ser. No. 08/883,780 and published International Application PCT/US97/11174 filed Jun. 27, 1997, incorporated by reference in its entirety.

In the depicted embodiment, a conductive wire 220 is wound about a portion of the core 214 so as to form an inductive device. Although FIG. 2A depicts a single coil, in some embodiments, two or more coils may be used. In the depicted embodiment, the coin 224 or other object to be discriminated is positioned in the vicinity of the gap (in the depicted embodiment, within the gap 216). Thus, in the depicted embodiment the gap width 218 is somewhat larger than the thickness 222 of the thickest coin to be sensed by the sensor 212, to allow for mis-alignment, movement, deformity, or dirtiness of the coin. Preferably, the gap 216 is as small as possible, consistent with practical passage of the coin. In one embodiment, the gap is about 4 mm.

FIG. 2B depicts a sensor 212, positioned with respect to a coin conveying rail 232, such that, as the coin 224 moves in the direction shown by the arrow 234, the rail guides the coin 224 through the gap 216 of the sensor 212. Although FIG. 2B depicts the coin 224 traveling in a vertical (on-edge) orientation, the device could be configured so that the coin 224 travels in other orientations, such as in a lateral (horizontal) configuration or angles therebetween. Although FIG. 2B depicts a configuration in which the coin 224 moves down the rail 232 in response to gravity, coin movement can be achieved by other unpowered or powered means such as a conveyor belt.

The single sensing core 212 is positioned relative to the coin 224 so that nearly all the magnetic field produced by the coil interacts with the coin which provides a relatively intense electromagnetic field in the region traversed by a coin or other object. Preferably, the sensor 212 can be used to obtain information on two different parameters of a coin 224 or other object. An oscillating electromagnetic field is generated by a sensor 212. The oscillating electromagnetic field is composed of one or more frequency components.

The electromagnetic field interacts with the coin 224, and these interactions are monitored and used to classify the coin according to its physical properties. All frequency components of the magnetic field are phase-locked to a common reference frequency. The phase relationships between the various frequencies are locked in order to avoid interference between frequencies and with any neighboring cores or sensors and to facilitate accurate determination of the interaction of each frequency component with the coin 224.

In one embodiment, low and high frequency coils (only one coil is shown) on the core 214 form a part of oscillator circuits (not shown). The circuits are configured to maintain oscillation of the signal through the coils at a substantially constant frequency, even as the effective inductance of the coil changes (e.g. in response to passage of a coin). The amount of change in other components of the circuit needed to offset the change in inductance (and thus maintain the frequency at a substantially constant value) is a measure of the magnitude of the change in the inductance caused by the passage of the coin, and indicative of coin diameter.

In addition to providing information related to coin diameter, the sensor can also be used to provide information related to coin conductance, preferably substantially simultaneously with providing the diameter information. As a coin moves past the coil 220, there will be an amount of energy loss and the amplitude of the signal in the coil will change in a manner related to the conductance of the coin 224 (or portions thereof). For a given effective diameter of the coin, the energy loss in the eddy currents will be inversely related to the conductivity of the coin material penetrated by the magnetic field.

Referring once again to FIG. 1, coins which are recognized and properly positioned or spaced are redirected by a deflector door 62 out of the default (gravity-fed) coin path 68 into an acceptance bin or trolley 66*a,b*. Any coins or other objects which are not thus actively accepted travel along a default path 68 to the customer return area 22. Preferably, information is sensed which permits an estimate of coin velocity and/or acceleration so that the deflector mechanism 62 can be timed to deflect coins even though different coins may be traveling at different velocities (e.g. owing to stickiness or adhesion).

Figure 3A:
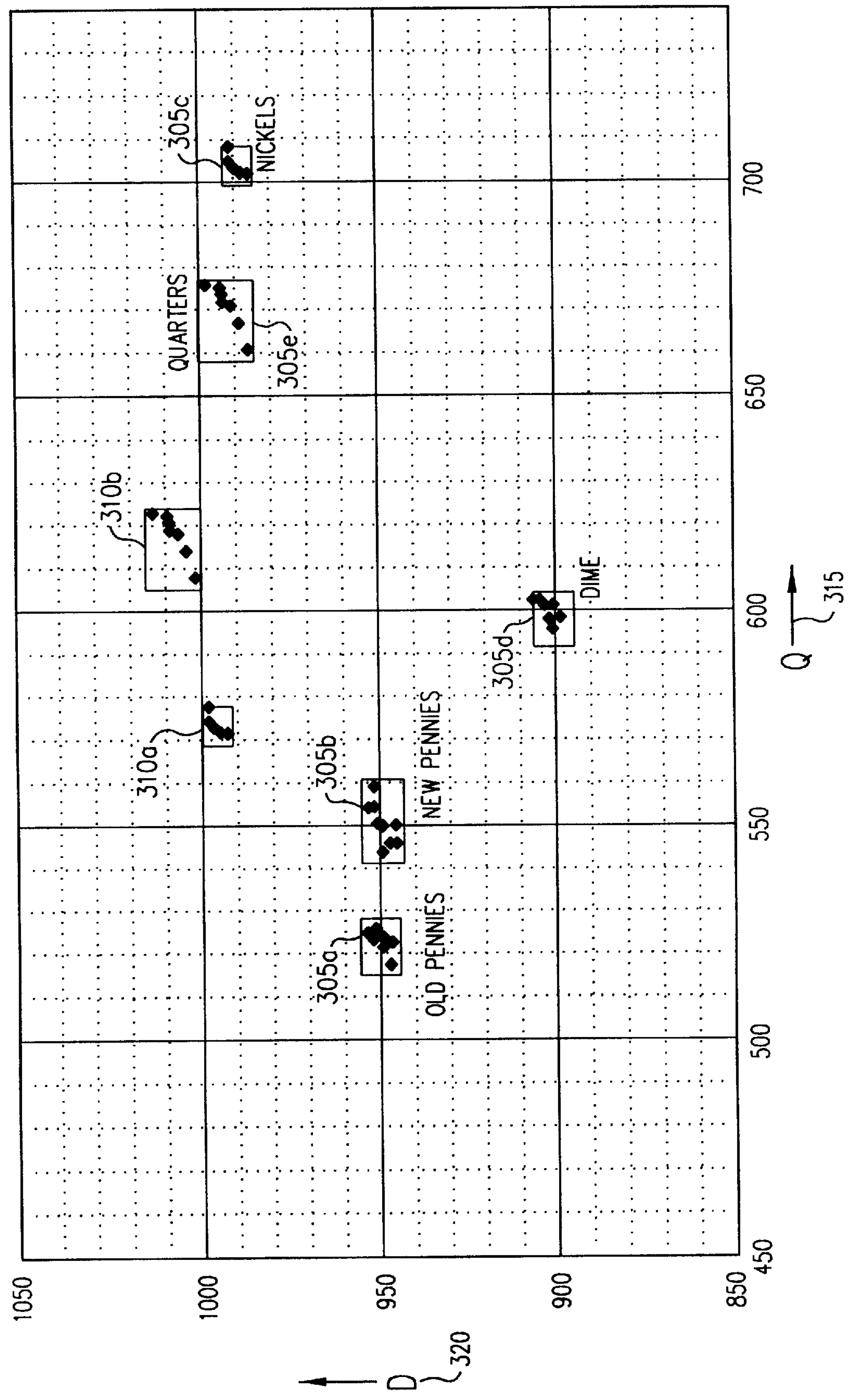
FIG. 3A depicts standard data and tolerance regions of a type that may be used for discriminating coins on the basis of data output by sensors of an embodiment of the present invention which are excited by a high frequency coil.
Figure 3B:
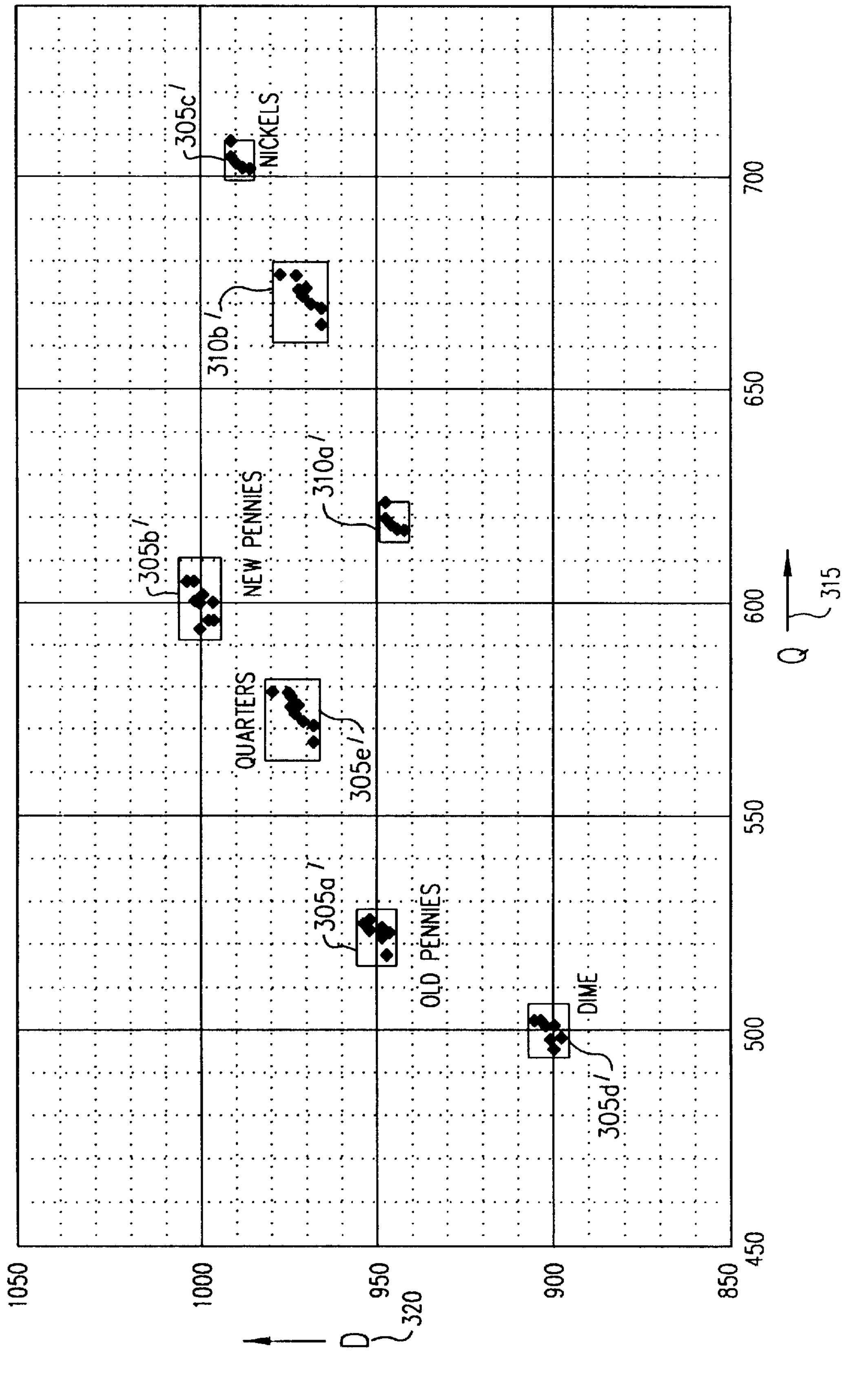
FIG. 3B depicts standard data and tolerance regions of a type that may be used for discriminating coins on the basis of data output by sensors of an embodiment of the present invention which are excited by a low frequency coil.

FIGS. 3A and 3B depict high and low frequency Q and D data for different U.S. government-minted coins and promotional coins where Q values 315 are along the abscissa and D values 320 are along the ordinate direction. The Q and D data shown is derived from the magnetic core sensor which is excited by a high frequency coil and low frequency coil. The values for the data points in FIGS. 3A and 3B are in arbitrary units. A number of features of the data are apparent from FIGS. 3A and 3B. First, it is noted that the Q, D data points for different denominations of government-minted and types of promotional coins are clustered in the sense that a given Q, D data point for a coin tends to be closer to data points for the same type of coin than for a different type of coin. Second, it is noted that the relative position of the types for the low frequency data (FIG. 3B) are different from the relative positions for corresponding types in the high frequency graph FIG. 3A. Methods of using high and low frequency Q and D data are disclosed in Ser. No. 08/883,780 and PCT/US97/11174.

One method of using standard reference data of the type depicted in FIGS. 3A and 3B to determine the type of an unknown coin is to define Q, D regions on each of the high frequency and low frequency graphs in the vicinity of the data points. For example, in FIGS. 3A and 3B, regions 305*a–e*, 310*a–b*, 305*a'–e'*, 310*a'–b'* are depicted as rectangular areas encompassing the data points. According to one embodiment, when low frequency and high frequency Q and D data 315, 320 are input to the computer in response to the coin moving past the sensor, the high frequency Q, D values for the unknown coin are compared to each of the regions 305*a*–305*e*, 310*a–b* of the high frequency graph FIG. 3A and the low frequency Q, D data is compared to each of the regions 305*a'*–305*e'*, 310*a'–b'* of the low frequency graph FIG. 3B. If the unknown coin lies within the predefined regions corresponding to the same type for each of the two graphs FIG. 3A and FIG. 3B, the coin is indicated as having that type. If the Q, D data falls outside the regions 305*a–e*, 310*a–b*, 305*a'–e'*, 310*a'–b'* on the two graphs or if the data point of the unknown coin or object falls inside a region corresponding to a first type with a high frequency graph but a different type with low frequency graph, the coin or other object is indicated as not corresponding to any of the types defined in the graphs of FIGS. 3A and 3B.

In one embodiment, the apparatus in which the coin discrimination device is used may be provided with a communication device such as a modem and may be configured to permit the definition of the regions 305*a–e*, 310*a–b*, 305*a'–e'*, 310*a'–b'* or other data or software to be modified remotely (i.e., to be downloaded to a field site from a central site). In another embodiment, the device is configured to automatically adjust the definitions of the regions 305*a–e*, 310*a–b*, 305*a'–e'*, 310*a'–b'* in response to ongoing statistical analysis of the Q, D data for coins which are discriminated using the device, to provide a type of self calibration for the coin discriminator.

Figure 4:
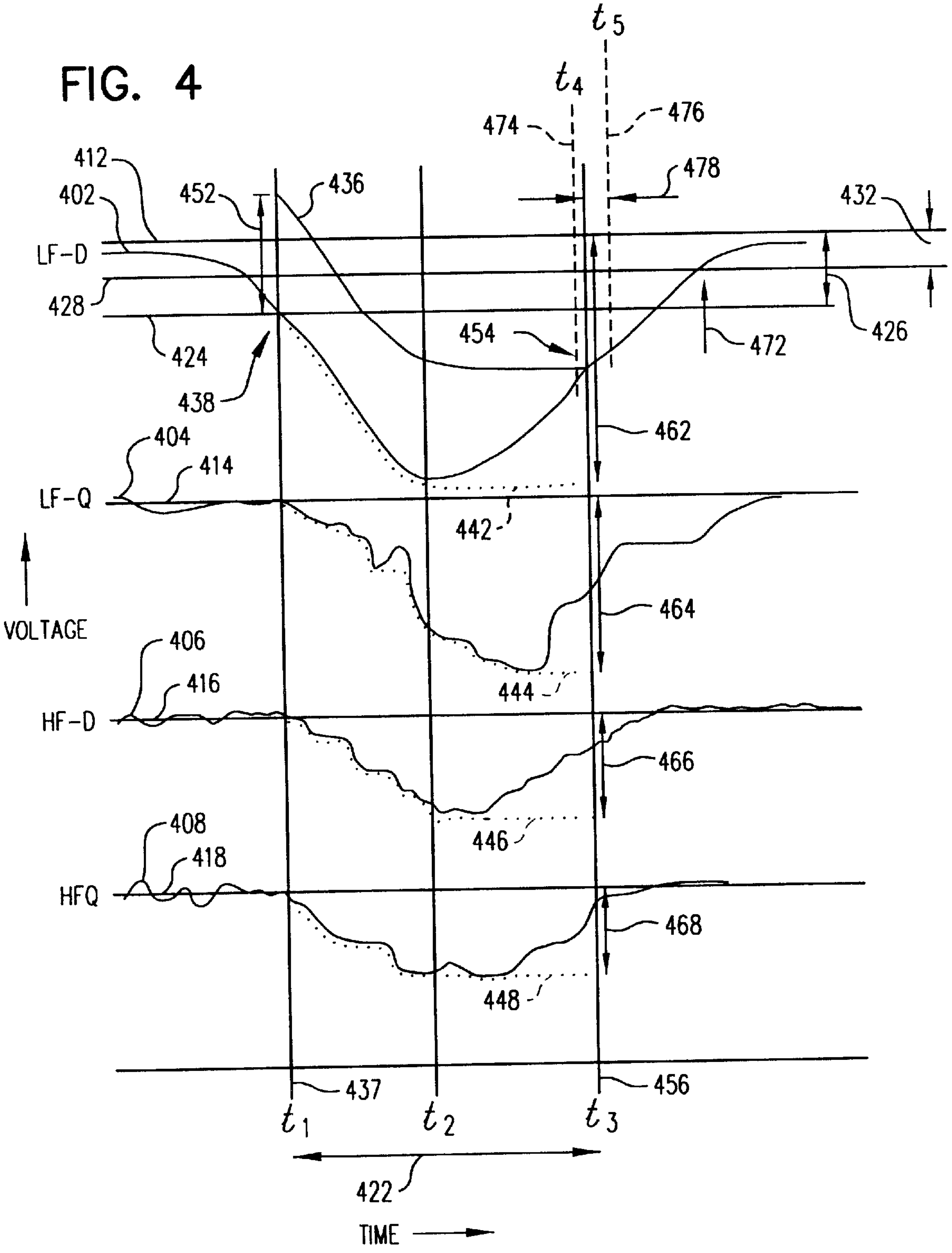
FIG. 4 is a graph of a hypothetical example of sensor signals, according to an embodiment of the present invention.

A method for deriving, from four sensor signals LF-D 402, LF-Q 404, HF-D 406 and HF-Q 408 a set of values or a "signature" indicative of a coin which has passed the sensor 58 (see FIG. 1), is described in connection with the graphs of FIG. 4 which show a hypothetical example of the four signals during a period of time in which a coin passes through the arms of the sensor. Units of FIG. 4 are arbitrary since FIG. 4 is only used to illustrate the principles behind this embodiment. A baseline value 412, 414, 416, 418 is associated with each of the sensor signals, representing a value equal to the average or mean value for that signal when no coins are adjacent the sensor. Although, in the depicted embodiment, the LF-D signal is used to define a window of time 422 during which the minimum values for each of the four signals 402, 404, 406, 408 will be determined and other threshold-crossing events, (at least in part because this signal typically has the sharpest peak), it would be possible to use other signals to define any or all of the various crossing events, or it may be possible to define the window separately for each signal.

In the depicted embodiment, the base line value 412 associated with the LF-D signal 402 is used to define a descent threshold 424 (equal to the LF-D baseline 412 minus a predefined descent offset 426, and a predefined gap threshold 428 equal to the LF-D baseline 412 minus a gap offset 432).

The beginning of a coin passage past the sensor is signaled by the LF-D signal 402 becoming less than the descent threshold 424 which, in the embodiment of FIG. 4, occurs at time $t_1$ 437. When this event 438 occurs, a number of values are initialized or stored by the software. The status is set to a value indicating that the window 422 is open. Both the "peak" time value and the "lead" time value are set equal to the clock value, i.e., equal to $t_1$ 437. Four variables LF-$D_{MIN}$ 442, LF-$Q_{MIN}$ 444, HF-$D_{MIN}$ 446 and HF-$Q_{MIN}$ 448, are used to hold a value indicating the minimum signal values, for each of the signals 402, 404, 406, 408, thus-far achieved during the window 422 and thus are initialized at the $t_1$ values for each of the variables 402, 404, 406, 408. In the illustration of FIG. 4, the running minimum values 442, 444, 446, 448 are depicted as dotted lines, slightly offset vertically downward for clarity.

During the time that the window is open 422, the minimum-holding variables LF-$D_{MIN}$, LF-$Q_{MIN}$, HF-$D_{MIN}$ and HF-$Q_{MIN}$ will be updated, as needed, to reflect the minimum value thus-far achieved. In the depicted embodiment, the four values are updated serially and cyclically, once every clock signal. Updating of values can be distributed in a different fashion if it is desired, for example, to provide greater time resolution for some variables than for others. It is believed that, by over sampling specific channels, recognition and accuracy can be improved. As the LF-D value is being tested and, if necessary, updated, a value for an ascent threshold 436 (which will be used to define the end of the window 422, as described below) is calculated or updated. The value for the ascent threshold 436 is calculated or updated as a value equal to the current value for LF-$D_{MIN}$ 442 plus a predefined ascent hysteresis 452.

Whenever the LF-$D_{MIN}$ value 442 must be updated (i.e., when the value of LF-D descends below the previously-stored minimum value), the "peak" time value is also updated by being made equal to the current clock value. In this way, at the end of the window 422, the "peak" variable will hold a value indicating the time at which LF-D 402 reached its minimum value within the window 422.

As a coin passes through the arms of a sensor, the four signal values 402, 404, 406, 408 will, in general, reach a minimum value and then begin once more to ascend toward the baseline value 412, 414, 416, 418. In the depicted embodiment, the window 422 is declared "closed" when the LF-D value 402 raises to a point that it equals the current value for the ascent value threshold 436. In the illustration of FIG. 4, this event 454 occurs at time $t_3$ 456. Upon detection of this event, the current value for the clock (i.e., the value indicating time $t_3$) is stored in the "trail" variable. Thus, at this point, three times have been stored in three variables: "lead" holds a value indicating time $t_1$, i.e., the time at which the window was opened; "peak" holds a value indicating time $t_2$, i.e., the minimum value for variable LF-D 402; and variable "trail" holds a value indicating time $t_3$, i.e., the time when the window 422 was closed.

The other portion of the signature for the coin which was just detected (in addition to the three time variables) are values indicating the minimum achieved, within the window 432, for each of the variables 402, 404, 406, 408. These values are calculated by subtracting the minimum values at time $t_3$ 442, 444, 446, 448 from the respective baseline values 412, 414, 416, 418 to yield four difference or delta values, ΔLF-D 462, ΔLF-Q 464, ΔHF-D 466 and ΔHF-Q 468. Providing output which is relative to the baseline value for each signal is useful in avoiding sensitivity to temperature changes.

Although, at time $t_3$ 456, all the values required for the coin signature have been obtained, in the depicted embodiment, the system is not yet placed in a "ready" state. This is because it is desired to assure that there is at least a minimum gap between the coin which was just detected and any following coin. It is also desirable to maintain at least a minimum distance or gap from any preceding coin. In general, it is believed useful to provide at least some spacing between coins for accurate sensor reading, since coins which are touching can result in eddy current passing between coins. Maintaining a minimum gap as coins move toward the door 62 (see FIG. 1) is useful in making sure that door 62 will strike the coin at the desired time and location. Striking too soon or too late may result in deflecting an accepted coin other than into the acceptance bin, degrading system accuracy.

Information gathered by the sensor 58 (see FIG. 1) may also be used in connection with assuring the existence of a preferred minimum gap between coins. In this way, if coins are too closely spaced, one or more coins which might otherwise be an accepted coin, will not be deflected (and will not be "counted" as an accepted coin). Similarly, in one embodiment, a coin having an acceleration less than a threshold (such as less than half a maximum acceleration) will not be accepted.

Accordingly, in order to assure an adequate leading gap, the system is not placed in a "ready" state until the LF-D signal 402 has reached a value equal to the gap threshold 428. After the system verifies that this event 472 has occurred, the status is set equal to "ready" and the system returns to an idle state to await passage of the next coin.

To provide for a minimum preferred trailing gap, in one embodiment, the software monitors the LF-D signal 402 for a short time after the ascending hysteresis criterion has been satisfied. If the signal has moved sufficiently back towards the baseline 412 (measured either with respect to the baseline or with respect to the peak) after a predetermined time period, then an adequate trailing gap exists and the door, if the coin is an accepted coin, will be actuated. If the trailing gap is not achieved, the actuation pulse is canceled, and normally the coin will be returned to the user. In all cases, software thresholds are preferably calibrated using the smallest coins (e.g., a U.S. dime in the case of a U.S. coin mix).

Because the occurrence of events such as the crossing of thresholds 438, 454, 472 are only tested at discrete time intervals, in most cases, the event will not be detected until some time after it has occurred. For example, it may happen that, with regard to the ascent-crossing event 454, the previous event-test at time $t_4$ 474 occurs before the crossing event 454 and the next event-test occurs at time $t_5$ 476, a period of time 478 after the crossing event 454. Accordingly, in one embodiment, once a test determines that a crossing event has occurred, interpolation such as linear interpolation, spline-fit interpolation or the like, is used to provide a more accurate estimate of the actual time of the event 454.

As noted above, by time $t_3$ 456, all the values required for the coin signature have been obtained. Also, by time $t_3$, the information which can be used for calculating the time at which the door 62 (see FIG. 1) should be activated (assuming the coin is identified as an accepted coin) is available. Because the distance from the sensor to the door is constant and known, the amount of time required for a coin to travel to the preferred position with respect to the door can be calculated exactly if the acceleration of the coin along the rail is known (and constant) and a velocity, such as the velocity at the sensor is known. According to one method, acceleration is calculated by comparing the velocity of the coin as it moves past the sensor 58 with the velocity of the coin as it passes over the "knee" in the transition region (not shown). In one embodiment, the initial "knee" velocity is assumed to be a single value for all coins, in one case, 0.5 meters/second. Knowing the velocity at two locations (the knee and the sensor location 58) and knowing the distance from the knee to the sensor location 58, the acceleration experienced by the coin can be calculated. Based on this calculated acceleration, it is then possible to calculate how long it will be, continuing at that acceleration, before the coin is positioned at the preferred location over the actuator. This system essentially operates on a principle of assuming an initial velocity and using measurements of the sensor to ultimately calculate how friction (or other factors such as surface tension) affects the acceleration being experienced by each coin. Another approach might be used in which an effective friction was assumed as a constant value and the data gathered at the sensor was used to calculate the initial ("knee") velocity.

In any case, the calculation of the time when the coin will reach the preferred position can be expected to have some amount of error (i.e., difference between calculated position and actual position at the door activation time). The error can arise from a number of factors including departures from the assumption regarding the knee velocity, non-constant values for friction along the rail, and the like. In one embodiment it has been found that, using the described procedure, and for the depicted and described design, the worst-case error occurs with the smallest coin (e.g., amount 17.5 mm in diameter) and amounts to approximately 6 mm in either direction. It is believed that, in at least some environments, an error window of 6 mm is tolerable (i.e., results in a relatively low rate of misdirecting coins or other objects).

In order to implement this procedure, data obtained at the sensor 58 is used to calculate a velocity. According to one scheme, time $t_1$ 436 is taken as the time when the coin first enters the sensor and time $t_2$ (the "peak" time) is taken as the time when the coin is centered on the sensor, and thus has traveled a distance approximately equal to a coin radius. Because, once the coin has been recognized, the radius of the coin is known (e.g. using a look-up table), it is possible to calculate velocity as radius divided by the difference $(t_2-t_1)$.

The promotional coins are minted to enhance the effectiveness of the promotion. In one embodiment, a first and a second type of promotional coins are minted so that an unaided participant cannot detect whether their coin is of a first type or a second type. Both types of promotional coins have the same imprinted pattern and coloration, but the composition and/or physical dimension of each type is different. When the participant deposits one or more promotional coins interspersed with any government-minted coins into the coin counter 10 (see FIG. 1), the coin counter, using substantially a method as described above, discriminates the promotional coins from the government-minted coins. The coin counter 10 further discriminates one or more first promotional coins from one or more second promotional coins. Each type of promotional coin is associated with a different prize, so that the participant is held in suspense as to their prize until the coin counter 10 is used to discrimination their promotional coin.

Referring once again to FIGS. 3A,B, the first and second types of promotional coins are minted such that their Q, D values 315, 320 are different at both the high and low frequencies. Software detects the promotional coins and their type by determining if their Q, D values at the high and low frequency properly correspond to the appropriate Q, D ranges 310*a,b*, 310*a',b'*. Only when a coin is properly within the corresponding high and low frequency ranges 310*a,a'* or 310*b,b'* will the coin be recognized as a valid promotional coin. To recognize the promotional coins, the software which detects the types of coins will have to be rewritten, but the hardware can remain unchanged. Using the hardware without modification substantially reduces the cost of sponsoring a promotion.

Figure 5:
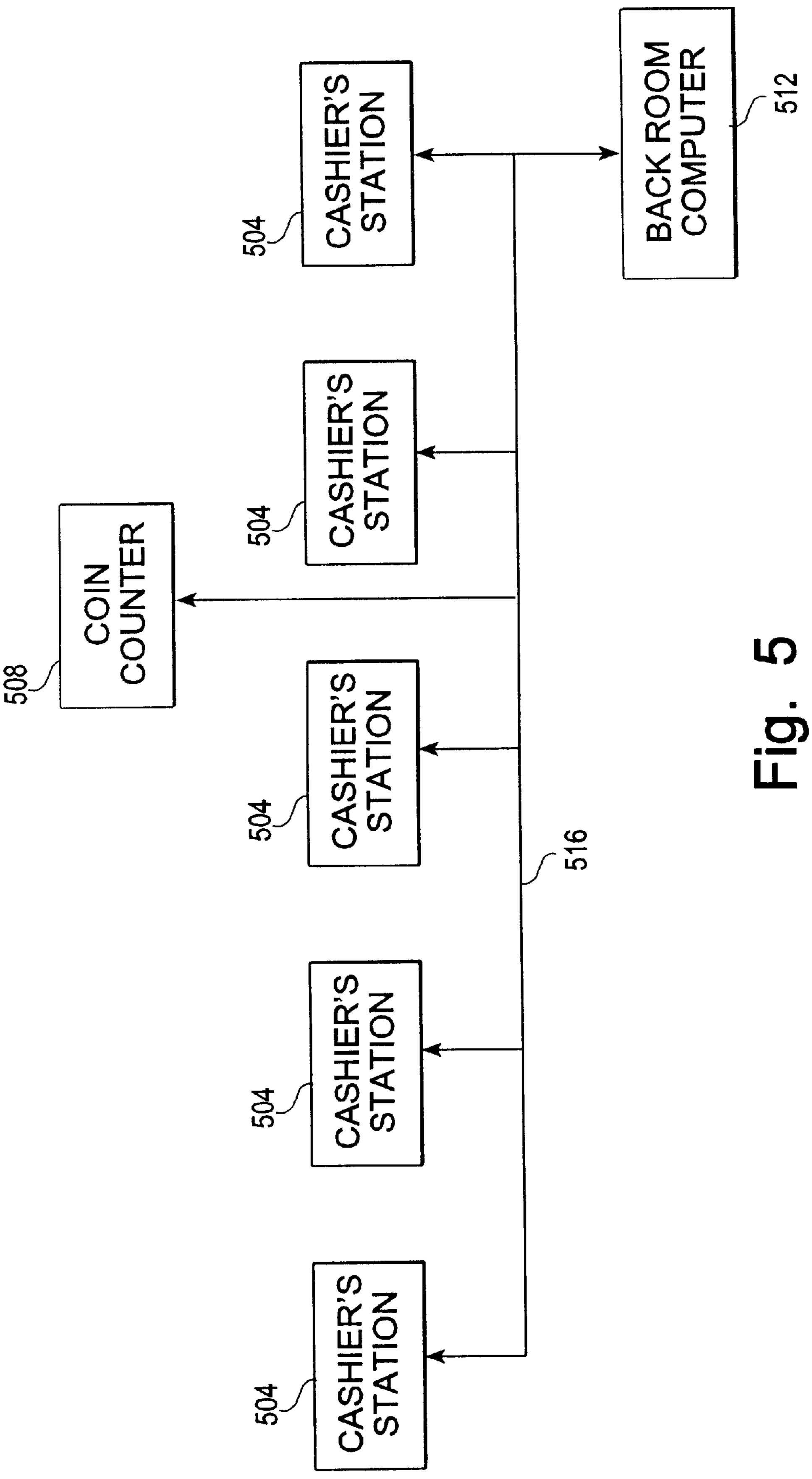
FIG. 5 is a block diagram of an interconnection of an coin counter with other in-store computerized hardware according to one embodiment of the present invention.

An embodiment of the present invention, as integrated into a typical retail store computer system, is depicted in FIG. 5. Communication between a cashier's station 504, a coin counter 508 and a back room computer 512 takes place over a common communication bus 516. The communication bus 516 serves at least two purposes: (1) relaying previously programmed pricing information from the back room computer 512 to each cashier's station 504 when a customer presents an item at check-out time, and (2) relaying verification of any cash voucher distributed from the coin counter 508 to the cashier's station 504 after a customer deposits either government-minted and/or promotional coins. After a customer deposits coins, a cash or merchandise voucher 18 (see FIG. 1) is generated by the coin counter 508 which would be presented at the cashier's station for redemption. Direct communication from the coin counter 508 to the cashier's station 504 provides electronic verification the voucher 18 is not counterfeit. Counterfeit disbursement receipts are more difficult to detect without electronic verification between the cashier's station 504 and coin counter 508. The communication bus 516 could be implemented, among other ways, as a hardwired serial bus, a hardwired parallel bus, a wireless transceiver, or local area network.

Figure 6:
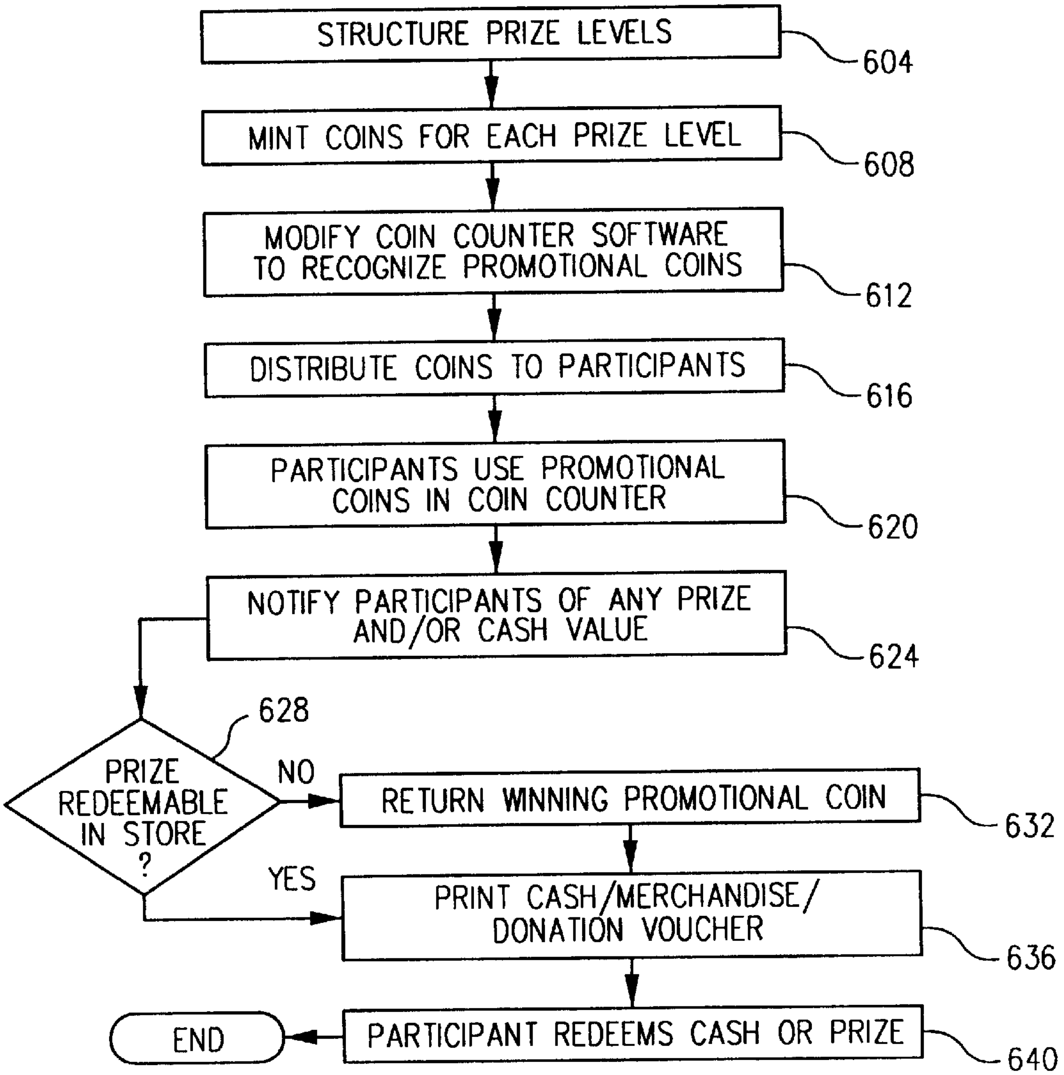
FIG. 6 is a flow chart of development of a coin counter promotion according to one embodiment of the present invention.

According to one embodiment of the present invention, the steps to take in implementing a coin counter promotion are shown in FIG. 6. Initially, the design of the promotion is decided so that the number of prize levels in step 604 is known. Sponsors of the promotion may decide to have any number of different promotional coin types of promotional coins that would each correspond to a different prize level. Preferably, there would be two types where the first type denoted a winner and a second type is not associated with a prize.

For minting the coins 608, each prize level preferably has its own promotional coin type, which to the participant would appear indistinguishable from other types of promotional coins, but which the coin counter is able to effectively discriminate. Engineering may be required to develop coin compositions and/or dimensions which are distinguishable by the coin counter, but not the participant. Care should also be taken during development of coin compositions to provide compositions and/or dimensions sufficiently different from the composition of government-minted coins to assure none of the promotional coins are recognized by the coin counters as government-minted coins (or vice versa). It can be appreciated that security precautions are advisable during minting to make sure the desired number of winning types of promotional coins are minted without extra, and that the winning types are randomly mixed with the rest of the promotional coins without any being stolen.

Before any coin counter could recognize the promotional coins instead of rejecting them, the software within the coin counter needs modification in step 612. The high and low frequency Q, D data for each type of promotional coin must be programmed so that the sensing mechanism recognizes and distinguishes the promotional coins. Experimentation may be required when modifying the software to assure high accuracy when detecting the promotional coins. In addition to recognizing the promotional coins, the software requires modification so that the user interface properly reacts in the new ways required to implement the promotion.

After the promotion is structured and the coin counters are reprogrammed, the promotional coins are distributed to participants in step 616. For example, the coins may be mailed to potential participants or handed out at a store or other location. Preferably, the coins are mailed to potential participant's homes so that they could gather up their change at home in preparation for a visit to a coin counter. Additional instructions and advertizing may be included with the promotional coin to further encourage and entice those reluctant to use the coin counter. More specifically, the location of and directions to coin counters most convenient to the potential participant may be included with the promotional coin or coins.

Once a potential participant receives one or more promotional coins, one desire of the promotion sponsors is to have the recipient use the coin counter in step 620. Following instructions on the coin counter and/or included with the promotional coin, the participant places one or more coins into the coin counter, which could include both government-minted and promotional coins. After the coins are received, the coin counter recognizes the promotional coins and government-minted coins in accordance to the new software modified in step 612. In other words, both promotional coins and government-minted coins are distinguished and at least the government-minted coins are counted.

In step 624, participants are notified of any prize or cash due to them. Before the modifications to the software of step 612, the coin counter would only notify the participant of the cash value of the government-minted coins, but with the software modifications, the participant is notified of both the cash value of the government-minted coins and any prize associated with the promotional coin. The notification may take place by displaying a message on the screen 32 (see FIG. 1), announcing a message using the speaker 28, or any other appropriate method. Typically, notification will include outputting a printed notification which may be incorporated with or separate from the voucher 18.

After a winning promotional coin is recognized in step 624, the reprogrammed software may decide whether the prize is redeemable inside the store or at another location in step 628. In one embodiment, small prizes are redeemed at the store hosting the coin counter, while large prizes are redeemed at another location more convenient to the sponsors of the promotion. If the prize is small and redeemable in the store (e.g., by a store cashier), a cash or donation voucher 18 (see FIG. 1) is printed in step 636 and the coin is deposited in one of the coin trolleys 66*a,b*. Alternatively if the prize is large, the coin is returned and instructions are provided to allow the participant to redeem the prize at another location in step 632.

Regardless of whether the prize is redeemable in the host store, any cash due from government-minted coins is distributed by outputting a cash voucher 18 in step 636. Typically, the cash voucher 18 is redeemable for cash or merchandise in the host store. In the case of a donation, the participant is given the choice in step 624 to donate the prize from the promotional coin or cash due from the government-minted coins to a list of predetermined charities. If the participant chooses to donate the proceeds owed, a donation voucher 18 is printed in step 636 which can serve as documentation of the donation for tax purposes. If the prize awarded is in the form of merchandise, a merchandise voucher 18 is printed in step 636.

After the participant finishes using the coin counter 10, either a promotional coin for a large prize or a cash, a merchandise or a donation voucher 18 is in the participant's possession. The cash or merchandise voucher 18 resulting from government-minted coins or a small prize award would be used at the store hosting the coin counter in step 640. As explained in detail with relation to FIG. 5, the coin counter can communicate the cash or merchandise voucher 18 to the store computers in order to validate the voucher. In the case of a large prize being won by the participant, it could be redeemed at another location in step 640 because, among other reasons, the host store may not have the funds available to pay a large prize.

Figure 7A:
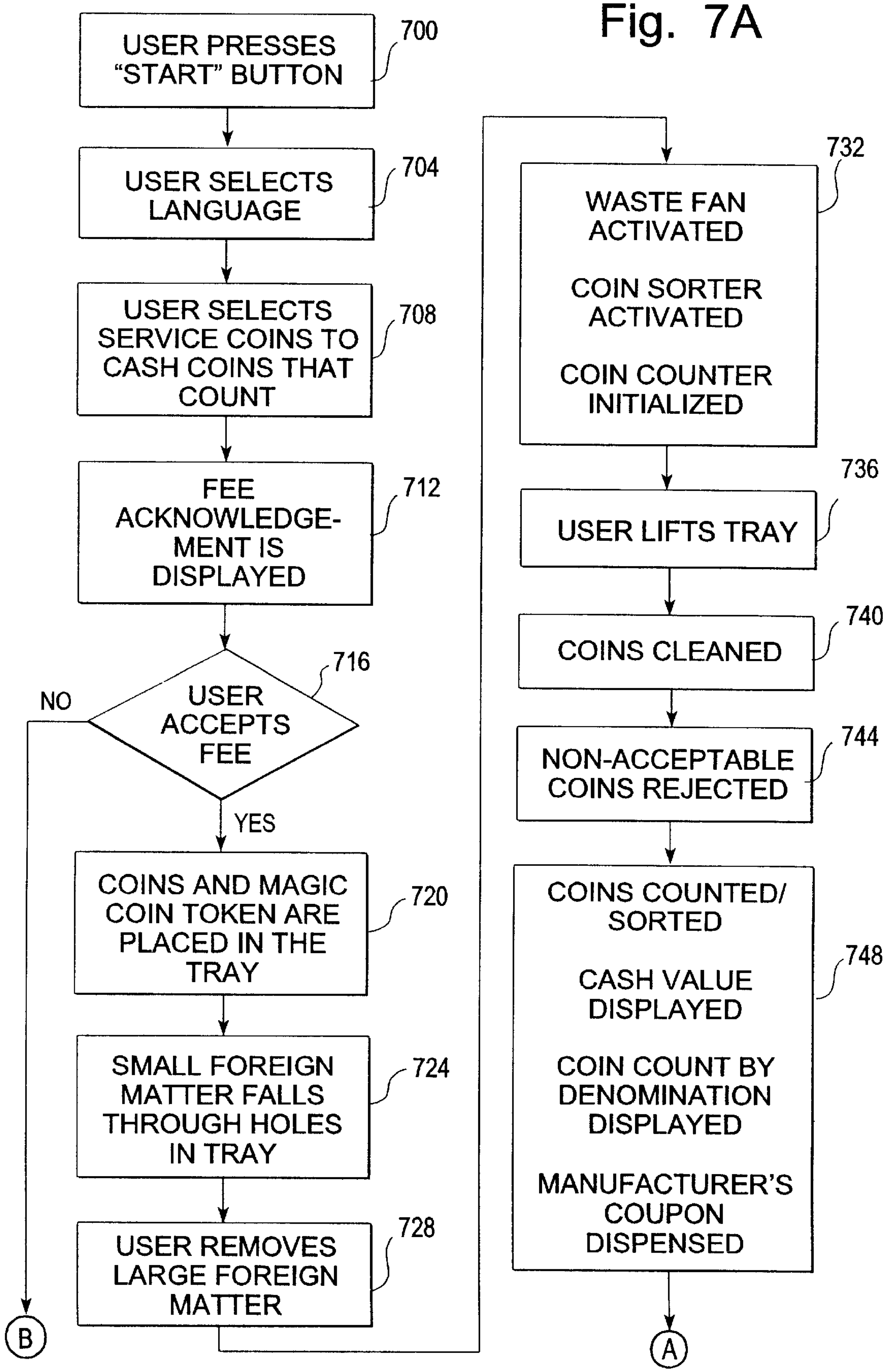
FIGS. 7A–B is a flow chart of the operation of the software in the coin counter according to one embodiment of the present invention.
Figure 7B:
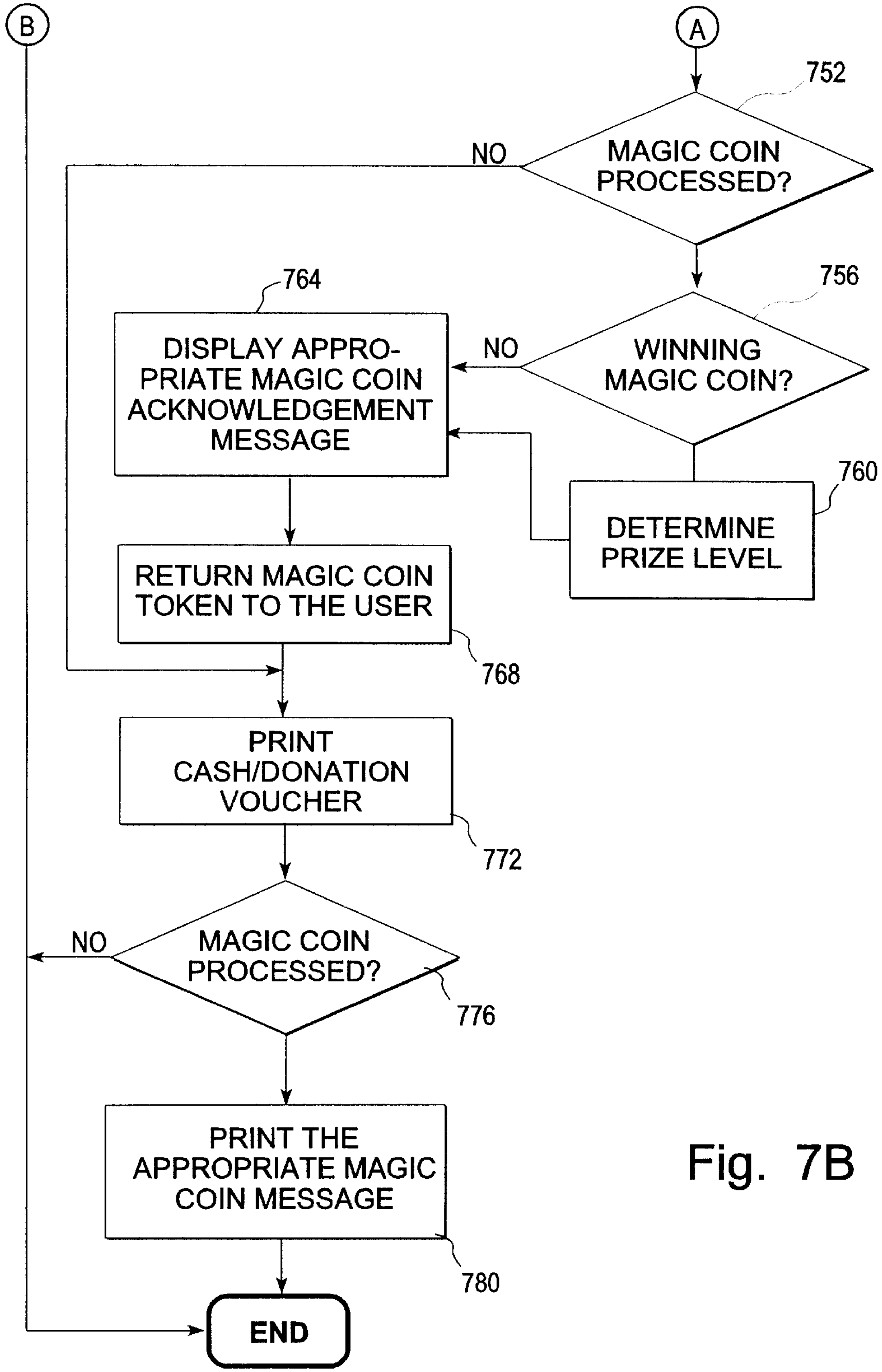

For one embodiment, a detailed flow chart of the interaction between the participant (or user) and a coin counter 10 (see FIG. 1), which has been reprogrammed to handle promotional coins, is shown in FIGS. 7A–C. Interaction begins with the user pressing the start button in step 700. By pressing the start button, the coin counter is notified that a transaction is about to begin. In order to properly interact with the user, a choice of common languages is displayed in step 704, whereupon, the user chooses the most appropriate language. In step 708, the user is given a choice on whether to receive a cash voucher 18 for the coins deposited or to donate the coins. In other words if the "coins to cash" option is selected a cash voucher 18 will be dispensed, whereas if "coins that count" option is selected a donation receipt will be dispensed.

Since the counting of government-minted coins is typically performed for a fee, the user is asked if the fee is acceptable in step 712. If the user does not accept the fee in step 716, processing of the transaction is halted and the machines returns to an idle state in which the next user can be served. However if the user accepts the fee, processing of the transaction proceeds, whereupon the coin counter requests the government-minted coins and promotional coins be placed in the input tray 16 (see FIG. 1) 720. In one embodiment, the input tray 16 has holes which allow small foreign matter to be removed from the coins in step 724. A message appears on the display 32 in step 728 requesting the user to further remove large foreign matter which may have inadvertently been put on the input tray 16.

Preferably, the waste fan, coin sorter and coin counter are started in step 732. With the machinery active, the user is requested to lift the tray 16 in order to input the coins in step 736, whereupon the coins are cleaned in step 740. By feeding the coins past the sensor 58 (see FIG. 1) the government-minted coins and promotional coins are recognized whereas the non-acceptable coins are rejected in respective steps 748 and 744. Step 748 further displays the government-minted coins received by denomination and their corresponding cash value while dispensing any manufacturer's coupons.

After all coins have been counted, a determination of whether a promotional coin has been processed in step 752 as shown in FIG. 7B. For example, the determination may be made by comparing Q and D values for each processed coin or token with predefined Q and D ranges, preferably at both high and low frequencies, to determine if the Q and D values for the processed coin or token fall within Q and D ranges which are associated with one of the types of promotional coins. If the promotional coin is not detected in step 752, the cash or donation voucher 18 is printed in step 772 and the transaction is complete. However, if the promotional coin is detected in step 752, a further detection is made to determine if the promotional coin received is a winning type in step 756 (e.g. by determining whether the Q and D values for the promotional coin fall within predefined Q and D ranges which are associated with a winning type of promotional coin) whereupon the prize level is determined in step 760. Regardless of whether or not the promotional coin was a winning type, an appropriate message acknowledging participation in the promotion is displayed in step 764 before the promotional coin is returned in step 768. Depending on whether the user decided to receive or donate the coins counted in step 708, a cash or donation voucher 18 is printed for the user at step 772.

Referring to the portion of the flow chart labeled FIG. 7C, if a promotional coin was processed (see step 776) another message is displayed at step 780. This message may, among other things, thank the user for participation if the promotional coin type was a loser, or give instructions on how to redeem the winning promotional coin before ending the transaction. In one embodiment at least large prizes (or, if desired, all prizes) will be distributed in a fashion separate from the coin discriminator device and/or the retail location where it is placed, such as being distributed from one or more central locations. In one embodiment the winning promotional coin is returned to the user 768, such as by diverting the promotional coin to a coin return location 22, and an acknowledgement, notice or message is output, such as by printing a message on or with a voucher, preferably instructing the user how to obtain the prize. In one embodiment the system is configured such that the user must present both the returned winning promotional coin and the printed acknowledgement or voucher to a prize or clearing agent for prize redemption. Therefore, in the way depicted in FIGS. 7A–C, the revised software resident in the coin counter 10 can appropriately manage detection of a promotional coin and provide for awarding and/or dispensing the appropriate prize.

In light of the above description, a number of advantages of the present invention are readily apparent. Communication between the coin counter and store computers allows verification of all prize vouchers 18 and thwarts counterfeit vouchers. The participant is required to use the item being promoted, namely the coin counter, because the unaided participant cannot determine if the promotional coin is a winner. Because the coins appear identical, a winning type is kept secret until one objective of the promotion (i.e., use of the coin counter) is achieved. The promotion encourages the participant to use the coin counter rather than a less desirable or unintended course of action. Implementation of the promotion is inexpensive because the hardware typically does not require modification. The coin counter notifies the participant of their prize and validates the winning promotional coin so additional support personnel is unnecessary.

A number of variations and modifications of the invention can also be used. In different embodiments, the participant could be notified of their prize in any one or more of the following ways: (1) a printed voucher 18 (see FIG. 1), (2) a message displayed on the video screen 32, (3) an audio message from the speaker 28, (4) notification by store personnel after they are electronically notified, (5) a flashing light or siren connected to the coin counter, and/or (6) mailing a notification to the participant. In an alternative embodiment, promotional coins are valid only at particular coin counters; if inserted into the wrong coin counter, the coin is rejected. In this way, the promotion could be limited, among other ways, to particular retailers and/or a geographic location.

Promotions could be structured to require a number of promotional coins. Previously discussed embodiments only used two types of promotional coins, other embodiments may use any number of different types of promotional coins where each type indicates a different prize level. Alternatively, the coin counter may require a predetermined number of promotional coins or a predetermined minimum of government-minted coins before awarding certain prizes. A coin could be given to the participant each time they perform a desired action such as buying groceries at a predetermined store. In this way, the participant would have to collect a number of promotional coins before becoming eligible for certain prizes.

The embodiment depicted in FIG. 5 shows the coin counter being able to communicate with the other store computers, but the coin counter could be isolated from the store computers in another embodiment. In this embodiment, the cash and merchandise vouchers 18 are presented to the cashier without the benefit of electronic verification from the coin counter. However, anti-counterfeiting techniques could be used to thwart fraud in lieu of electronic verification such as microprinting, holograms, and the like.

Although the embodiments described in relation to FIGS. 6 and 7A–C provide a cash or merchandise voucher 18 to users, the coin counter could also distribute cash, money order, or any cash equivalent. Additionally, a modem could be added to the coin counter so that software updates could be performed remotely and any winning prizes could be communicated to a central office via the modem. In other embodiments, the prize awarded in this promotion could be cash, a discount on store merchandise and/or predetermined store merchandise. Also, embodiments of the coin counter could accept promotional coins without requiring the deposit of government-minted coins, so that no "purchase" is necessary to win. Requiring the participant to submit government-minted coins as a condition to participating in the promotion, may violate some local laws.

The embodiment in FIG. 6 only returned promotional coins from large prizes while the other promotional coins were kept, while the embodiment in FIG. 7 returned all promotional coins. Other embodiments could either keep the promotional coins, return the promotional coins, or any combination thereof as predetermined by the sponsors of the promotion.

Although the application has been described by way of a preferred embodiment and certain variations and modifications, other variations and modifications can also be used, the invention being defined by the following claims.

What is claimed is:

1. A method for encouraging use of a coin counter, comprising:

providing a coin counter which is configured to receive, all at once, a plurality of randomly oriented government-minted coins of multiple denominations and other objects, discriminate said government-minted coins, using at least a first processor, and output a voucher related to the value of said government-minted coins;

distributing a plurality of promotional coins, different from said government-minted coins;

configuring said coin counter to discriminate said promotional coins and, in response to at least a first of said promotional coins, output an indication of a first prize.

2. A method, as claimed in claim 1, wherein:

at least a first coin-parameter detection apparatus is used for discriminating said government-minted coins, and said promotional coins are discriminated using said first coin-parameter detection apparatus.

3. A method, as claimed in claim 1, wherein:

at least a first parameter is used for discriminating said government-minted coins, and at least said first parameter is used for discriminating said promotional coins.

4. A method as claimed in claim 3, wherein said first parameter is selected from among the group consisting of mass, conductivity and magnetic permeability.

5. A method, as claimed in claim 1, wherein said step of configuring includes configuring said coin counter to discriminate at least a second of said promotional coins from said first of said promotional coins and, in response to said second of said promotional coins, output an indication of a second prize, different from said first prize.

6. A method, as claimed in claim 5, wherein said first and second promotional coins are substantially identical in size, weight and appearance.

7. A method, as claimed in claim 1, further comprising:

configuring said coin counter to output said indication of said prize as an indication of a monetary prize.

8. A method, as claimed in claim 1, further comprising:

configuring said coin counter to output said indication of said prize as a purchase discount.

9. A method, as claimed in claim 1, further comprising:

configuring said coin counter to output said indication of said prize as being redeemable at restricted locations.

10. A method, as claimed in claim 9, wherein said restricted locations include locations in a predefined geographic area.

11. A method as claimed in claim 9, wherein said restricted locations include predetermined retail locations.

12. A method as claimed in claim 1, wherein said indication includes a printed output.

13. A method as claimed in claim 1, wherein said indication includes an output on a video display.

14. A method as claimed in claim 1, wherein said indication includes an audio output.

15. A method, as claimed in claim 1, further comprising returning at least said first promotional coins by moving to a customer-accessible return box.

16. In a device for receiving, all at once, a plurality of randomly oriented coins of multiple denominations and other objects, discriminating said coins, using at least a first processor, and outputting a voucher related to the value of said coins, apparatus for encouraging use of said device comprising:

a computer-readable storage medium storing programming instructions configured to:

discriminate at least a first coin different from any of said multiple denominations; and output at least a first prize in response to detection of said first coin.

17. A device for receiving, as claimed in claim 16, wherein:

at least a first coin-parameter detection apparatus is used for discriminating said multiple denominations, and said first coin is discriminated using said first coin-parameter detection apparatus.

18. A device for receiving, as claimed in claim 16, wherein:

at least a first parameter is used for discriminating said multiple denominations, and at least said first parameter is used for discriminating said first coin.

19. A device for receiving, as claimed in claim 18, wherein said first parameter is selected from among the group consisting of mass, conductivity and magnetic permeability.

20. A device for receiving, as claimed in claim 16, wherein said programming instructions are configured to discriminate at least a second coin different from said first coin and any of said multiple denominations and, in response to said second coin, output an indication of a second prize, different from said first prize.

21. A device for receiving, as claimed in claim 20, wherein said first and second coins are substantially identical in size, weight and appearance.

22. A device for receiving, as claimed in claim 16, further comprising:

configuring said programming instructions to output said indication of said prize as an indication of a monetary prize.

23. A device for receiving, as claimed in claim 16, further comprising:

configuring said programming instructions to output said indication of said prize as a purchase discount.

24. A device for receiving, as claimed in claim 16, further comprising:

configuring said programming instructions to output said indication of said prize as being redeemable at restricted locations.

25. A device for receiving, as claimed in claim 24, wherein said restricted locations include locations in a predefined geographic area.

26. A device for receiving, as claimed in claim 24, wherein said restricted locations include predetermined retail locations.

27. A device for receiving, as claimed in claim 16, wherein said first prize is indicated on a printed output.

28. A device for receiving, as claimed in claim 16, wherein said first prize is indicated on an output on a video display.

29. A device for receiving, as claimed in claim 16, wherein said first prize is indicated on an audio output.

30. Apparatus for encouraging use of a coin counter, comprising:

means for receiving, all at once, a plurality of randomly oriented government-minted coins of multiple denominations and other objects, discriminating said government-minted coins, using at least a first processor, and outputting a voucher related to the value of said government-minted coins; and means, in said means for receiving, for discriminating promotional coins, different from said government-minted coins, and, in response to at least a first of said promotional coins, outputting an indication of a first prize.

31. An apparatus, as claimed in claim 30, wherein said discriminating means includes a sensing core to generate a oscillating electromagnetic field.

32. An apparatus, as claimed in claim 30, wherein:

at least a first coin-parameter detection apparatus is used for discriminating said government-minted coins, and said promotional coins are discriminated using said first coin-parameter detection apparatus.

33. An apparatus, as claimed in claim 30, wherein:

at least a first parameter is used for discriminating said government-minted coins, and at least said first parameter is used for discriminating said promotional coins.

34. An apparatus, as claimed in claim 33, wherein said first parameter is selected from among the group consisting of mass, conductivity and magnetic permeability.

35. An apparatus, as claimed in claim 30 further compising means for returning promotional coins to a user.

36. An apparatus, as claimed in claim 30, wherein said discriminating means configures said coin counter to discriminate at least a second of said promotional coins different from said first of said promotional coins and, in response to said second of said promotional coins, output an indication of a second prize, different from said first prize.

37. An apparatus, as claimed in claim 36, wherein said first and second promotional coins are substantially identical in size, weight and appearance.

38. An apparatus, as claimed in claim 30, further comprising:

configuring said coin counter to output said indication of said prize as an indication of a monetary prize.

39. An apparatus, as claimed in claim 30, further comprising:

configuring said coin counter to output said indication of said prize as a purchase discount.

40. An apparatus, as claimed in claim 30, further comprising:

configuring said coin counter to output said indication of said prize as being redeemable at restricted locations.

41. An apparatus, as claimed in claim 40, wherein said restricted locations include locations in a predefined geographic area.

42. An apparatus, as claimed in claim 40, wherein said restricted locations include predetermined retail locations.

43. An apparatus, as claimed in claim 30, wherein said first prize is indicated on a printed output.

44. An apparatus, as claimed in claim 30, wherein said first prize is indicated on an output on a video display.

45. An apparatus, as claimed in claim 30, wherein said first prize is indicated on an audio output.

46. A method for using promotional coins in a promotion, comprising:

distributing a plurality of promotional coins to a plurality of participants, said plurality of promotional coins including one or more first coins and one or more second coins, wherein the one or more first coins are indistinguishable from the one or more second coins using human sight alone; and providing a coin counter which is configured to receive, all at once, one or more promotional coins, government-minted coins and other objects wherein said coin counter distinguishes said first coins from said second coins.

47. A method, as claimed in claim 46, wherein said one or more first coins are indistinguishable from said one or more second coins using any of the five human senses.

48. A method, as claimed in claim 46, wherein said promotion encourages use of a product and said product distinguishes between said government-minted coins, said one or more first coins and said one or more second coins.

49. A method, as claimed in claim 46, wherein:

at least a first coin-parameter detection apparatus is used for discriminating said government-minted coins, and said promotional coins are discriminated using said first coin-parameter detection apparatus.

50. A method, as claimed in claim 46, wherein:

at least a first parameter is used for discriminating said government-minted coins, and at least said first parameter is used for discriminating said promotional coins.

51. A method as claimed in claim 50, wherein said first parameter is selected from among the group consisting of mass, conductivity and magnetic permeability.

52. A method, as claimed in claim 46, wherein said coin counter outputs an indication of a first prize in response to said first coin.

53. A method, as claimed in claim 46, wherein said coin counter is configured to discriminate at least said second coin from said first coin and, in response to said second coin, output an indication of a second prize.

54. A method, as claimed in claim 53, wherein said first and second promotional coins are substantially identical in size, weight and appearance.

* * * * *